(No Model.)  2 Sheets—Sheet 1.

L. J. SEVISON.
SULKY PLOW.

No. 582,551.  Patented May 11, 1897.

Attest  
Walter Donaldson  
F. L. Middleton

Inventor  
Luther J. Sevison  
by Ellis Spear  
Atty.

THE NORRIS PETERS CO., PHOTO-LITHO., WASHINGTON, D. C.

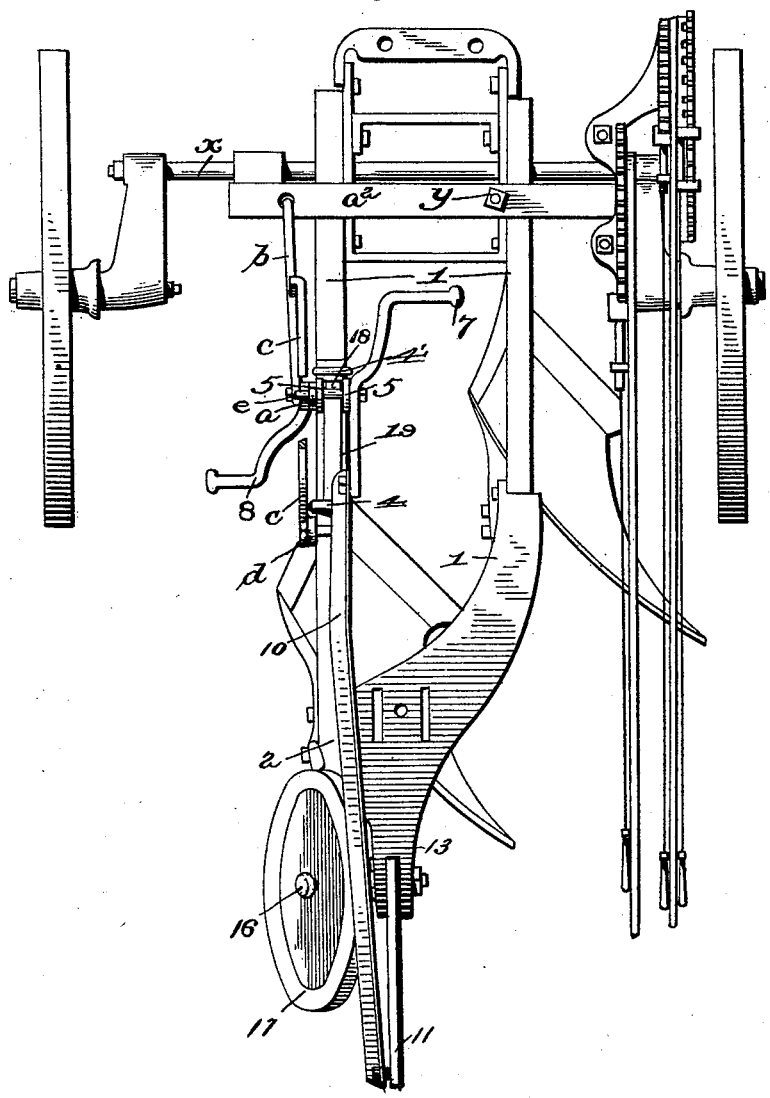

UNITED STATES PATENT OFFICE.

LUTHER J. SEVISON, OF FLORENCE, MICHIGAN.

SULKY-PLOW.

SPECIFICATION forming part of Letters Patent No. 582,551, dated May 11, 1897.

Application filed February 18, 1896. Serial No. 579,703. (No model.)

*To all whom it may concern:*

Be it known that I, LUTHER J. SEVISON, a citizen of the United States, residing at Florence, in the county of St. Joseph and State of Michigan, have invented certain new and useful Improvements in Sulky-Plows, of which the following is a specification, reference being had therein to the accompanying drawings.

It is the object of my invention to provide an attachment for sulky-plows, and especially gang-plows, that will enable a right-angular turn to be taken without necessitating the lifting of the plow partly or wholly out of the ground. This feature is particularly adaptable and advantageous in the plowing of large fields, as it permits the plow to remain in the ground at regular depths, thus making each corner turned a finished one. When a start is made at one side of a field and each of the sides plowed successively, gradually working toward the center, the furrow being thrown outwardly, or in starting from the center and working outwardly, one of the greatest disadvantages in sulky-plows, and especially in gang-plows, has been that a corner could not be turned with the plows in the ground at regular depths. To accomplish this result, I provide an improved landside for each plow in the form of a disk and provide in conjunction therewith suitable mechanism, as will be hereinafter particularly described, for lifting this landside when desirable, the desideratum occurring when a right-angular corner is to be turned.

My invention further provides mechanism for regulating at will the width of the furrow to be plowed.

The invention is illustrated in the accompanying drawings, in which—

Figure 1:
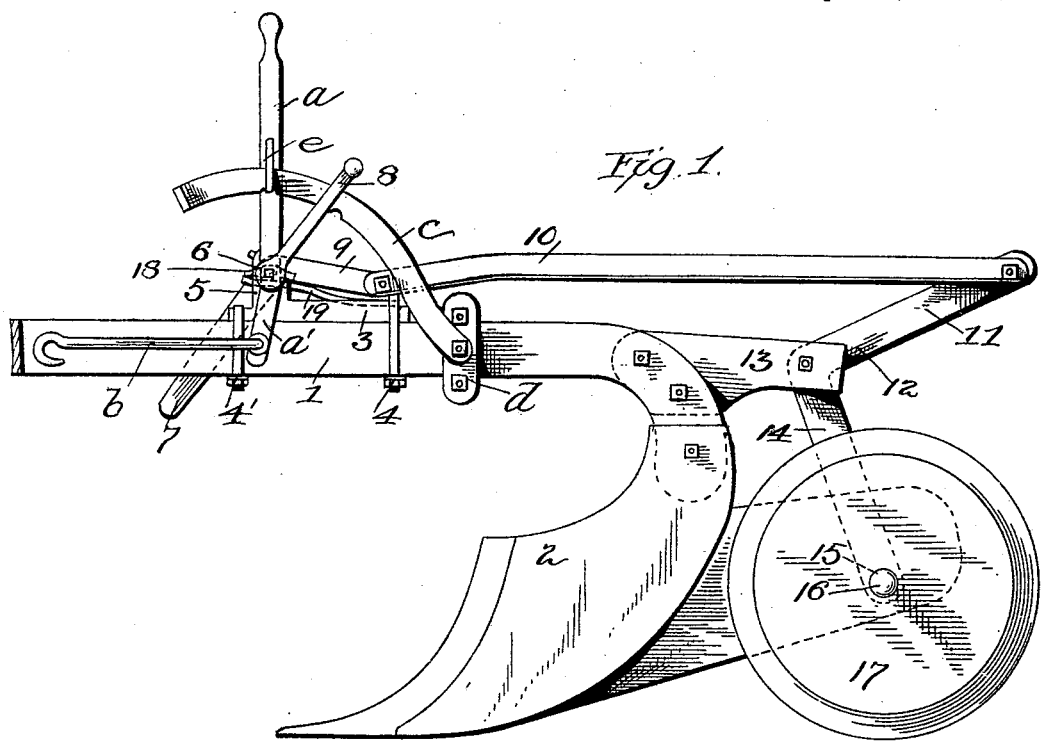
Figure 2:
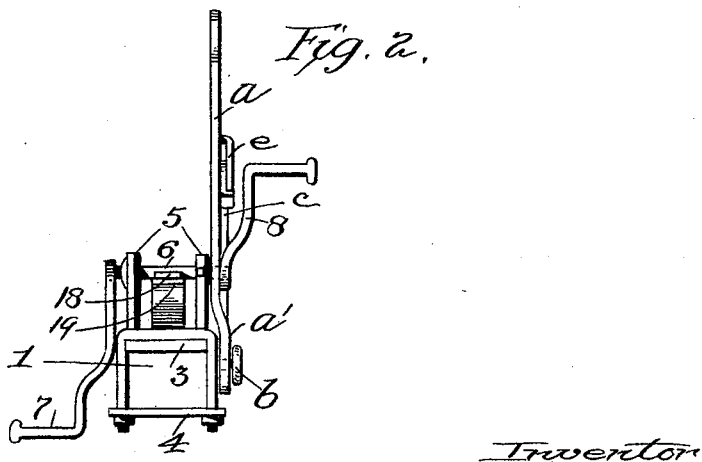

Figure 1 is a side elevation of my attachment in connection with a plow. Fig. 2 is a front elevation of the attachment detached. Fig. 3 is a plan view of the sulky-plow with my attachment in place.

The attachment is shown herein in connection with a portion of an ordinary gang-plow, the main shaft and supporting-wheel not being shown except in Fig. 3. The plow-beam having the divided front extension is shown at 1 having its rear end curved downwardly and having bolted thereto the plow-point 2. Placed upon the upper face of the intermediate portion of the beam 1 is a casting 3, held in place by the end clamp 4 4', this casting having the ear 5, extending upwardly from the opposite sides thereof, to provide bearings for the crank-shaft 6. The cranks 7 and 8, provided with suitable foot-cranks or pedals, are attached to opposite ends of this shaft, and the crank 7 is provided with a rearward extension 9, to which one end of the bent link 10 is secured, the opposite end of this link being attached to the end of the arm 11 of the bell-crank lever 12, that is pivoted between the forked end of the bracket 13, suitably bolted to the beam 1 just above the plow-point 2. The other arm 14 of the bell-crank lever is provided near its end with an opening through which a stud-shaft 15 projects, having a head 16 on its inner end and a suitable washer and nut at its outer end to hold it in position.

The landside of the plow consists of a disk 17, that is journaled on the shaft 15 and is held thereon between the inner face of the arm 14 and the head 16 before mentioned.

The crank-shaft 6 is provided with a projecting lug 18, that bears upon the upper face of the free end of the flat spring 19, which is confined at one end beneath the end clamp 4. In turning a corner when plowing, the parts being arranged as shown in Fig. 1, the crank 8 is shoved forwardly, which will draw the extension 9 and link 10 around and tilt the bell-crank lever 11, and thus raise the disk 17 out of the ground and allow the plow-point to turn while in the ground without being lifted and to round and plow the corner being turned.

The crank-shaft 6 as it is turned by the crank 8 will cause the lug 18 to depress the spring 19 until the lug reaches a position shown by the dotted lines, when the spring will rise up and again embrace the under side of the lug to prevent the dropping of the landside until the crank 7, which in the meantime has been thrown around, is pressed back into its first position, when all of the parts will assume their normal position, the landside again entering the ground.

To regulate the width of the furrow, I have provided the lever $a$, which is pivoted on the shaft 6 and is provided with the end $a'$, that extends below its pivotal point. A link $b$ is pivotally secured to the end of this extension $a'$, and the link is provided with a hooked end that is adapted to be connected to a cross-piece $a^2$, carried by the axle $x$ of the plow and pivotally connected at $y$ to one arm of the plow-beam, the link $b$ connected to the cross-piece $a^2$ to one side of the center of said piece. A recessed segment $c$ is pivoted at its lower end to the side plate $d$, secured by a suitable clamp to the beam 1, directly in rear of casting 3.

The segment $c$ passes through a staple $e$, fixed to the lever $a$, and this staple engages with the recesses in the segment.

When the operator desires to take less furrow, he raises the segment from engagement with the lever and draws the lever backwardly, and this action will throw the main axle around through connections between the link $b$ and said axle. The plows can thus be turned and held at an angle to the cranked axle of the plow, permitting a wider or narrower furrow to be plowed, as desired.

What I claim is—

1. The combination with a plow-point of a landside, a freely-swinging support therefor intermediately pivoted, a journal for said landside fixed directly in one end of said support, and mechanism connected to the opposite end thereof for tilting the same, substantially as described.

2. In combination in a plow, the landside, the bell-crank lever carrying the same, the crank-shaft and cranks, and the connection between one of said cranks and the lever for tilting the same, when said cranks are operated, substantially as described.

3. In combination, the landside, the bell-crank lever carrying the same, the crank and crank-shaft, the extension of one of said cranks, and the link connection between said extension and said lever, substantially as described.

4. In combination, the landside, the forked bracket, the bell-crank lever pivoted in said fork, the casting having the ears, the crank-shaft having the projecting lug, the crank, the extension of one of said cranks, the link connection between the same and said bell-crank lever, and the spring engaging with said lug, substantially as described.

5. In combination, in a sulky-plow, the crank-shaft, the lever pivoted thereon, and the link carried thereby adapted to be connected to the cranked axle of the plow to one side of the center of said axle, substantially as described.

6. In combination, in a sulky-plow, the crank-shaft, the lever pivoted thereon having a portion extending below said pivoted connection, the pivoted recessed segment for engaging said lever and the hooked link pivotally connected to said lower extension of said lever.

In testimony whereof I affix my signature in presence of two witnesses.

LUTHER J. SEVISON.

Witnesses:
F. W. KNOWLEN,
B. H. SEVISON.